Jan. 1, 1929.　　　　　　　　　　　　　　1,697,791
E. G. SPRUNG
BRAKE
Filed July 2, 1926
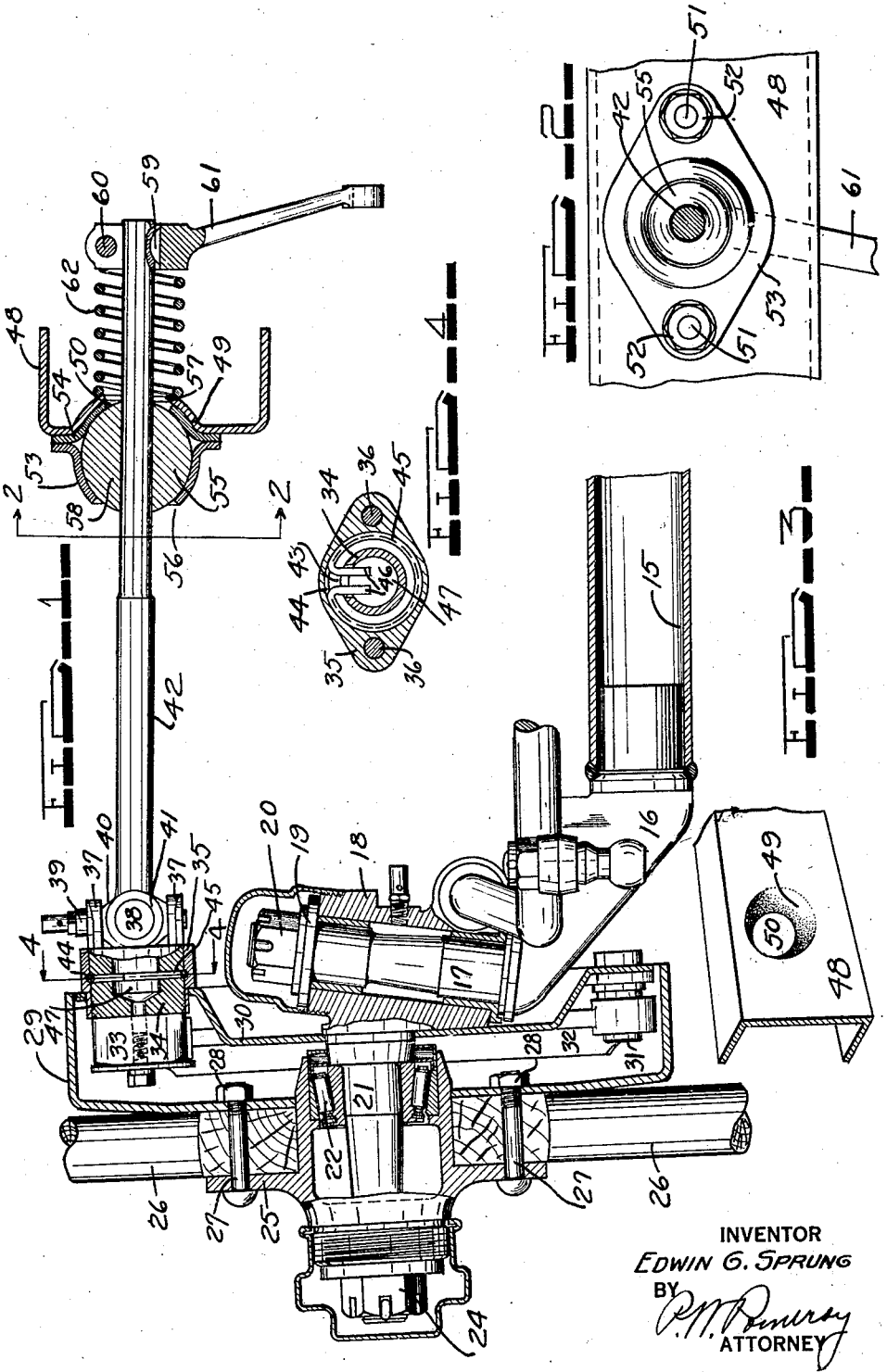
INVENTOR
EDWIN G. SPRUNG
BY
ATTORNEY Patented Jan. 1, 1929.

1,697,791

UNITED STATES PATENT OFFICE.

EDWIN G. SPRUNG, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed July 2, 1926. Serial No. 120,124.

This invention relates to a brake mechanism for motor vehicles, and particularly to improved means for anchoring the free end of the brake operating shaft at the chassis frame to permit operation of the vehicle brake, regardless of the position of the frame relative to the axle, and the principal object is to provide a construction that is simple, efficient in operation, and economical to manufacture, especially in large quantities.

Another object is to provide a means for anchoring the free end of the brake operating shaft to the chassis frame so as to permit operation of the brake regardless of the varying distance between the point of connection with the brake cam and the point of support at the vehicle frame.

Another object is to provide means for pivotally and slidably mounting the free end of a brake operating shaft to the vehicle frame.

A further object is to provide means for slidably mounting the free end of a brake operating shaft in a ball universally mounted in retainer cups secured to the frame side member and seating in a depression formed therein, the inner end of the operating shaft being provided with a coiled compression spring bearing against the inside of the frame.

A further object is to provide means for slidably mounting the free end of a brake operating shaft in a universally movable ball, which seats in a depression formed in the frame side member, and which is provided with a cup-shaped retainer secured to the frame side member for pivotally holding the ball in the depression.

A still further object is to provide means for holding a brake cam shaft against axial movement relative to its supporting bracket, said means comprising a split spring ring, which is adapted to seat partially in an annular groove in the supporting bracket and partially in an annular groove in the shaft, and which is adapted to be brought out of contact with the first-mentioned groove to allow the shaft to be slidably removed from the bracket.

These being among the objects of the present invention, the same consists of certain features of construction and combinations of parts to be hereinafter described with reference to the accompanying drawing, and then claimed, having the above and other objects in view.

In the accompanying drawing which illustrates a suitable embodiment of the present invention:—

Figure 1 is a vertical section taken through the left front wheel and adjacent frame side member of a motor vehicle chassis showing the method of anchoring the inner end of the brake operating shaft.

Figure 2 is a section taken on the line 2—2 of Figure 1 showing a side view of the support secured to the chassis frame side member.

Figure 3 is a partial perspective view of the frame side member showing the depression formed therein.

Figure 4 is a section taken on the line 4—4 of Figure 1.

Referring to the accompanying drawing, in which like numerals refer to like parts throughout the several views, the embodiment of the present invention is shown in connection with the front wheel brake mechanism of a motor vehicle, to which it is particularly adaptable. Shown in Figure 1 is a front axle 15 of the tubular type provided with an end member 16 terminating in an upwardly extending pin 17, upon which the steering knuckle 18 is pivoted, washers 19 and a nut 20 holding the same in place. The knuckle 18 is provided with the conventional outwardly projecting wheel spindle 21 carrying a rear bearing 22 and a front bearing (not shown), upon which the wheel hub 23 is rotatably supported and held thereon by a nut 24 threaded on to the spindle 21. The hub 23 is provided with a flange 25 against which the wheel spokes 26 abut and which are secured thereto by the bolts 27 and nuts 28, which also serve to support and secure the brake drum 29 to the hub 23 in concentric relation therewith. The knuckle 18 is provided with flanges (not shown) against which is secured the brake drum dust cover 30 in concentric relation with the drum 29, the cover 30 closing the open end thereof. Within the brake drum 29 and pivotally supported on the adjacent pins 31 secured to the dust cover 30 are the two brake shoes 32, the outer surfaces of which normally lie just out of contacting relationship with the inner surface of the drum 29, and whose free ends are drawn against the cam 33 by a spring (not shown) extending therebetween. The cam 33 is formed on the end of the short shaft 34, which projects through the dust cover 30 and is rotatably supported in the bracket 35, which also projects through the dust cover 30 and is secured thereto by screws 36.

The end of the shaft 34 opposite the cam 33 is formed to provide two arms 37 which serve as one yoke of a universal joint comprising cross pins 38 and 39, a block 40 and a yoke 41 formed on the end of the operating shaft 42. To prevent end play of the shaft 34, that is, to prevent it from moving axially in the bracket 35, a groove 43, as shown in Figure 4, is cut circumferentially in the shaft 34 and a mating groove 44 is cut in the bracket 35 and a non-continuous spring ring 45 having downwardly turned free ends 46 is inserted therein, the ends 46 extending down into the central opening 47 in the shaft 34. To remove the shaft 34 from the bracket 35, an implement is inserted in the opening 47 and the ends 46 are pulled toward each other, which brings the ring 45 down into the groove 43 and out of contact with the groove 44 in the bracket 35, which allows the shaft 34 to be slipped out of the bracket 35.

In constructions of this type, wherein the brake-operating shaft is supported at one end on the frame of the vehicle and the other end is on, or on a part supported by, the end of the axle, the distance between the point of support on the frame and on the axle varies with the movement of the axle relative to the frame, due to both horizontal and vertical movement of the springs which support the frame on the axle. It is apparent that means must be provided to compensate for this varying distance during relative movement between the axle 15 and frame 48. The present invention deals mainly with means for compensating for such action.

The frame side member 48 is formed with a spherical depression 49 therein and having a central opening 50, as shown in Figure 3. Secured to the side member 48 adjacent the opening 50 by bolts 51 and nuts 52 is a pair of ball retainers 53 and 54, in which a ball 55 is universally movable, the inner retainer 54 being seated in the depression 49 and both retainers 53 and 54 being formed with central openings 56 and 57 respectively. The ball 55 is provided with a circular opening 58, through which the inner end of the brake-operating shaft 42 slidably extends to the inner side of the frame member 48.

It is preferable that the outer retainer cup 53 be made of a heavy stamping, but the inner retainer cup 54 may be of somewhat lighter material as it merely acts as a bearing for the ball 55, the frame naturally absorbing the shocks which might be set up. Furthermore, in order to provide a still cheaper construction the inner retainer cup 54 may be left out entirely to allow the ball 58 to bear directly against the depression 49 in the frame member 48.

Held on the extreme inner end of the shaft 42 by a key 59 and bolt 60 is a rocker arm or lever 61, which is connected with the brake foot pedal by a suitable rod, and which is adapted to cause movement thereof when rotated about its axis, thereby acting to cause rotation of the cam 33 and spreading of the shoes 32 into contact with the drum 29. The rocker arm 61 holds a coil spring 62 in compression between it and the inner side of the frame member 48 and about the shaft 42 for holding the same against rattling. The openings 56 and 57 in the retainers 53 and 54 and the opening 50 in the frame 48 are all sufficiently large to allow the ball 55, and consequently the shaft 42, to be pivoted.

The advantages and the operation of the construction just described are readily apparent. It can be seen that while the vehicle is traveling and the frame constantly moving up and down relative to the axle, the ball pivots in its retainers and the operating shaft is free to slide through the opening in the ball, making it possible to rotate the shaft to operate the brake shoes, regardless of the positions of the frame and axle relative to each other and also regardless of the angle assumed by the vehicle wheels during steering of the same.

It can also be seen that the construction is simple and consists of few parts, which can be made economically, especially in large quantities. Formal changes may be made in the specific embodiment of the invention described without departing from the spirit and substance of the broad invention, the scope of which is commensurate with the appended claims.

What I claim is:

1. In a front wheel brake mechanism for a motor vehicle having a brake-operating shaft extending between a brake and a vehicle frame member, a spherical depression in the vertical web of said frame provided with a central aperture, a backing bearing member for said depression, an apertured ball seated in said bearing member and held against displacement by an apertured spherically seated cap whereby said ball has a substantial bearing on each side of the normal plane of said web, said shaft being slidably received in the aperture in said ball and projecting inwardly past said frame, an operating lever secured to the inner end of said shaft, and a coil spring surrounding said shaft and held under compression between said lever and said frame whereby to prevent rattling of said shaft.

2. In a front wheel brake mechanism for a motor vehicle, a brake support, a hollow bracket supported thereby, a rotatable shaft received within said hollow bracket, and means for preventing axial displacement of said shaft relative to said bracket comprising a circumferential groove in said shaft, a mating groove in said bracket, and a spring ring co-operating with both of said grooves.

3. In a front wheel brake mechanism for a motor vehicle, a brake support, a bracket provided with an opening supported thereby, a brake cam shaft provided with an axial opening rotatably supported within said opening in said bracket, and means for preventing axial displacement of said cam shaft comprising a circumferential groove therein, an aperture leading from said groove to the axial opening in said shaft, a mating groove in the walls of the opening in said bracket, and a non-continuous spring ring simultaneously engaging both of said grooves, the free ends of said ring being bent inwardly and projecting through said aperture into said axial opening.

4. In a front wheel brake mechanism for a motor vehicle having a brake-operating shaft extending between a brake and a vehicle frame member, means for supporting the inner end of said shaft comprising a cup formed in the vertical web of said frame, a bearing member seated in said cup, a ball slidably mounted on said shaft received in said bearing member, and a cap engaging said ball secured to said bearing member whereby said ball has a substantial bearing on each side of the vertical plane of said web.

5. In a front wheel brake mechanism for a motor vehicle having a brake-operating shaft extending between a brake and a vehicle frame member, means for supporting the inner end of said shaft comprising a cup having a central aperture therein to receive said shaft formed in the vertical web of said frame, a ball slidably and rotatably mounted on said shaft seated in said cup, and a cap engaging said ball secured to the vertical web of said frame for preventing bodily displacement of said ball, said ball having a substantial bearing on each side of the vertical plane of said web.

6. In a front wheel brake mechanism for a motor vehicle having a brake-operating shaft extending between a brake and a vehicle frame member, means for supporting the inner end of said shaft comprising a cup having a central aperture therein to receive said shaft formed in the vertical web of said frame, a ball slidably and rotatably mounted on said shaft seated in said cup, a cap engaging said ball secured to the vertical web of said frame for preventing bodily displacement of said ball, said ball having a substantial bearing on each side of the vertical plane of said web, and a spring surrounding said shaft held under compression thereon to prevent rattling of said shaft.

Signed by me at Detroit, Michigan, U. S. A., this 28th day of June, 1926.

EDWIN G. SPRUNG.